United States Patent [19]
Terajima

[11] Patent Number: 5,966,508
[45] Date of Patent: Oct. 12, 1999

[54] METHOD AND DEVICE FOR PREPARING DIGITAL PRINTS

[75] Inventor: Akirou Terajima, Kanagawa, Japan

[73] Assignee: Fuji Photo Film Co., Ltd., Kanagawa, Japan

[21] Appl. No.: 08/855,564

[22] Filed: May 13, 1997

[30] Foreign Application Priority Data

May 14, 1996 [JP] Japan .................................. 8-119391

[51] Int. Cl.⁶ .................................................. G06K 15/00
[52] U.S. Cl. ............................................ 395/113; 395/109
[58] Field of Search ..................... 395/101, 113, 395/106, 114, 109, 117, 836, 882; 707/527–528; 358/501, 504, 518, 527, 537, 461

[56] References Cited

U.S. PATENT DOCUMENTS 5,313,291  5/1994  Appel et al. ............................ 395/501

*Primary Examiner*—Arthur G. Evans
*Attorney, Agent, or Firm*—Sughrue, Mion, Zinn, Macpeak & Seas PLLC

[57] ABSTRACT

A method of preparing digital prints and a device for preparing digital prints are provided which prepare digital prints which are optimal in consideration of individual variations in output devices and exposure light sources due to production. In a state in which a liquid crystal panel is driven by using driving data set by a driving data setting section, a transmitted light amount sensor detects a transmitted light amount of the liquid crystal panel. At a look-up table changing section, contents of a look-up table are corrected on the basis of a relationship of transmitted light amount and driving data at those times.

7 Claims, 6 Drawing Sheets

F I G. 6
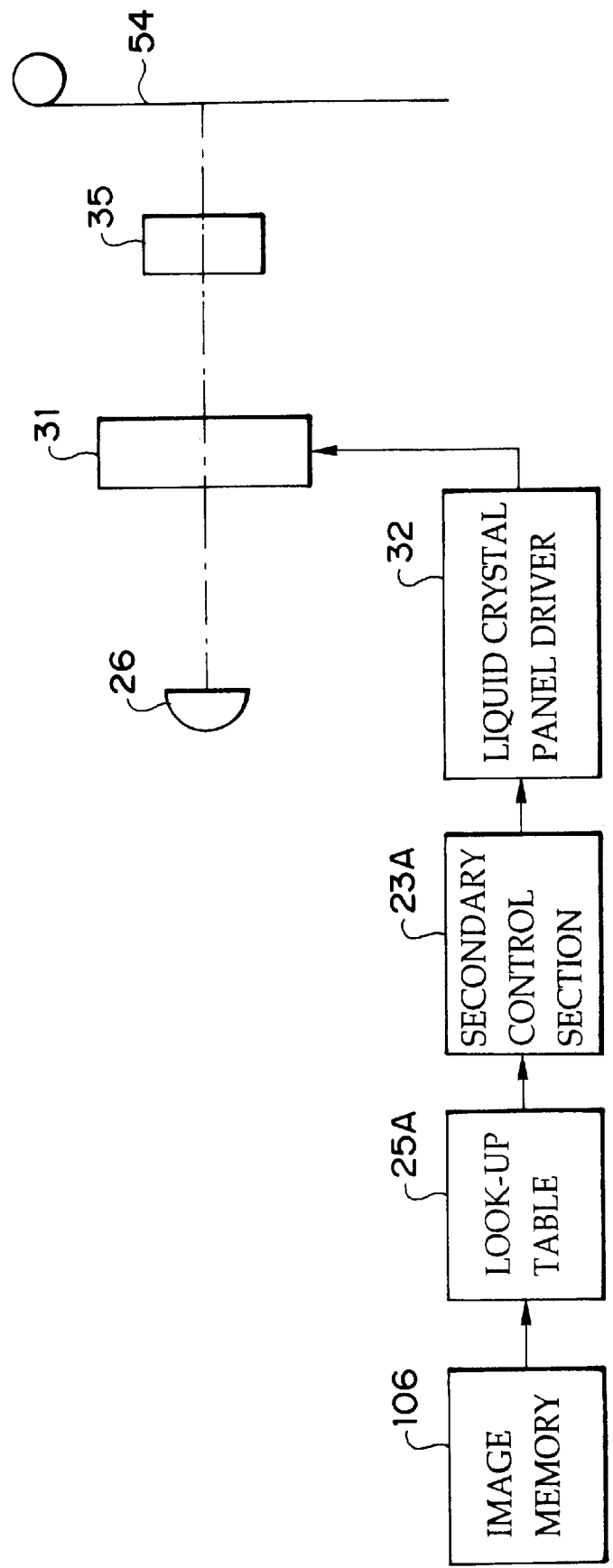

METHOD AND DEVICE FOR PREPARING DIGITAL PRINTS

BACKGROUND OF THE INVENTION

1. Field of the Invention

The present invention relates to a method for preparing digital prints and a device for preparing digital prints, and in particular, to a method for preparing digital prints and a device for preparing digital prints which prepare digital prints by using images recorded on photographic films.

2. Description of the Related Art

In recent years, index prints have been proposed as one type of digital print. Respective frames are printed on the index print in a matrix-like arrangement so that it can be easily determined what photographs were taken on one roll of developed film. A liquid crystal panel is used as an image display means at an index printer which can prepare such index prints. The plurality of image frames recorded on the photographic film are displayed at one time on the display surface of the liquid crystal panel, and simultaneously are printed onto a photographic printing paper as images which are smaller than normal prints.

FIG. 6 is a block diagram which summarily illustrates an example of the structure of an index printer using a conventional liquid crystal panel. Hereinafter, operation of an index printer using a conventional liquid crystal panel will be summarily described with reference to FIG. 6. In FIG. 6, image data of a photographic film for which an index print is to be prepared is stored in advance in an image memory 106.

For the image data of the photographic film for which an index print is to be prepared which image data is stored in the image memory 106, a look-up table 25A is converted into driving data for driving a liquid crystal panel 31 which serves as an output device. The conversion method is set in advance under the assumption that a standard liquid crystal panel and light source are used. At a secondary control section 23A, the liquid crystal panel 31 is driven, via a liquid crystal panel driver 32, by using liquid crystal panel driving data prepared by the look-up table 25A. The transmitted light amount of each pixel of the liquid crystal panel 31 is adjusted in accordance with the driving data so as to display the image. Due to the above operations, after an image is displayed on the liquid crystal panel 31, a light source 26 emits light so that the liquid crystal panel 31 is illuminated. The light transmitted through the liquid crystal panel 31 is collected by an exposure lens 35 and is imaged on a photographic printing paper 54 so as to form a print. The light transmitted through the liquid crystal panel 31 is parallel light.

The look-up table 25A used at this time is set on the basis of a standard characteristic of the liquid crystal panel and the exposure light source. Therefore, the look-up table 25A does not correspond to individual variations in liquid crystal panels or exposure light sources which variations arise due to production. As a result, it is not always the case that optimal liquid crystal panel driving data can be prepared.

SUMMARY OF THE INVENTION

In view of the aforementioned, an object of the present invention is to provide an optimal method of preparing digital prints and device for preparing digital prints in consideration of the individual variations in output devices or exposure light sources which variations arise during production.

In order to achieve the above-described object, a first aspect of the present invention is a method for preparing digital prints in which, when a digital print is to be prepared on the basis of digital image data, the digital image data is converted into driving data of an output device by a predetermined conversion table, and the output device is driven by using the driving data, comprising the step of: recognizing in advance an error at the time of conversion at an output device, which is being used in actuality, with respect to a standard output device which obtains appropriate images by converting digital image data into driving data in accordance with the predetermined conversion table, and correcting the output device which is being used.

In accordance with the first aspect of the present invention, the conversion table is corrected in advance for each output device which is used in actuality. As a result, the driving data of the output devices obtained by the conversion table correspond to the individual variations of the output devices which variations are due to production, and digital prints can be prepared in an optimal state.

The second aspect of the present invention is a device for preparing digital prints which prepares digital prints on the basis of digital image data, comprising: a conversion table which converts the digital image data into driving data of an output device; a driving data setting section which prepares driving data for driving the output device; a sensor for detecting an output state of the output device at a time the output device is driven, by using driving data prepared by said driving data setting section; and a conversion table changing section which corrects a conversion table on the basis of the output state of the output device detected by said sensor and on the basis of the prepared driving data.

In accordance with the second aspect, the sensor detects the output state of the output device at the time the output device is driven by using the driving data prepared by the driving data setting section. The conversion table is corrected on the basis of the results of detection and the prepared driving data. Therefore, the driving data of the output device obtained by the conversion table correspond to individual variations in output devices, and digital prints can be prepared in an optimal state.

In the device for preparing digital prints of the third aspect of the present invention, in the device for preparing digital prints of the second aspect, said output device is a liquid crystal panel, and the driving data prepared by said driving data setting section is prepared by changing a shaded state of the liquid crystal panel in steps, and said sensor detects a transmitted light amount of the liquid crystal panel at a time the liquid crystal panel is driven by using the driving data.

In accordance with the third aspect of the present invention, the output device is a liquid crystal panel. The driving data of the liquid crystal panel is prepared so as to change in steps. The transmitted light amount at the output side when the liquid crystal panel is driven by the driving data are detected, and the conversion table is corrected on the basis of the results of detection. Accordingly, even in a case in which the output device is a liquid crystal panel, digital prints corresponding to individual variations in liquid crystal panels can be prepared in an optimal state.

BRIEF DESCRIPTION OF THE DRAWINGS

FIG. 6 is a block diagram summarily illustrating an example of a structure of an index printer using a conventional liquid crystal panel.

DESCRIPTION OF THE PREFERRED EMBODIMENT

Hereinafter, details of an embodiment of the present invention will be described with reference to the drawings.

Figure 1:
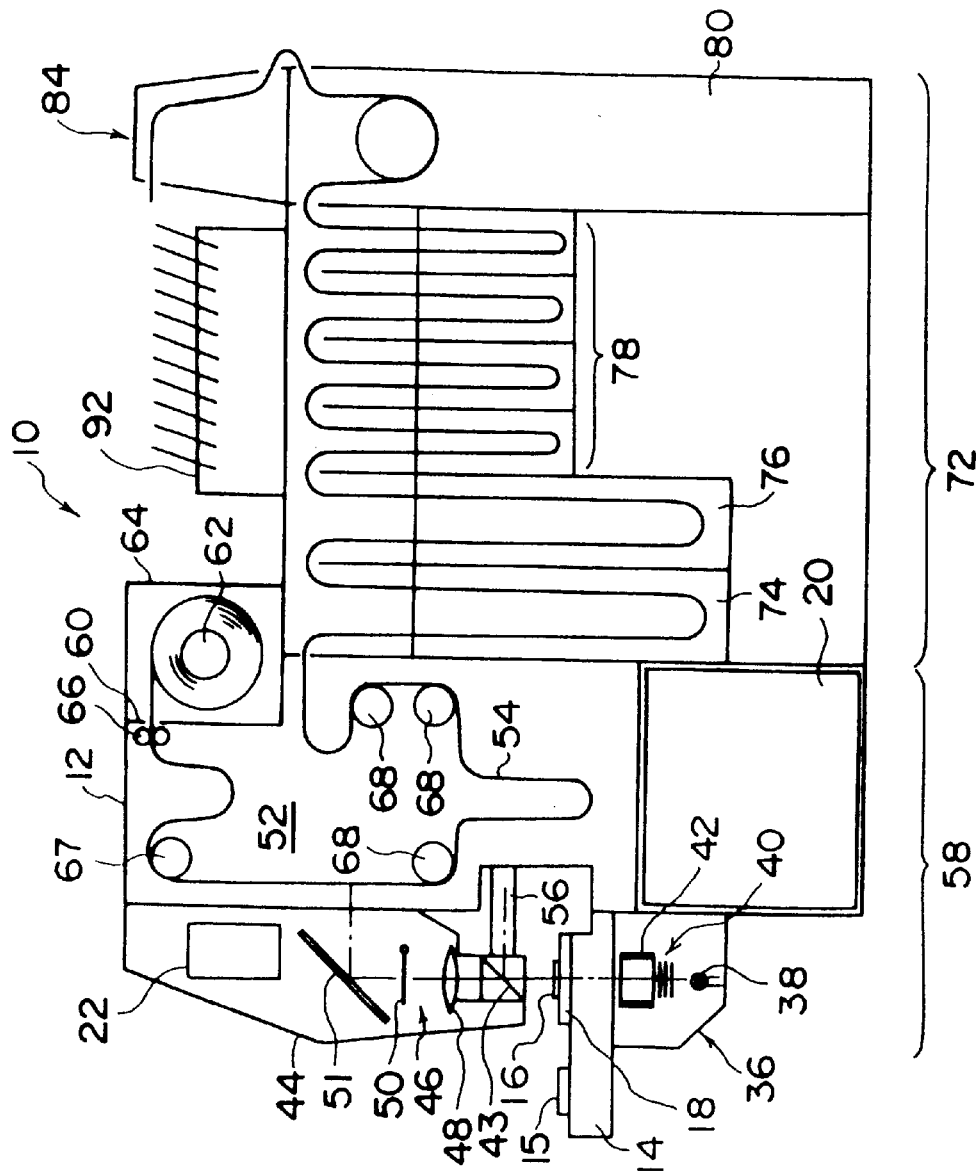
FIG. 1 is a schematic structural view of a printer processor of an embodiment of the present invention.

As illustrated in FIG. 1, the exterior of a printer processor 10 is covered by a casing 12. The printer processor 10 is formed by a printer section 58, which exposes main prints and secondary prints onto photographic printing papers, and a processor section 72, which carries out developing, fixing, rinsing and drying processing of the exposed photographic printing papers.

A work table 14 which projects from the casing 12 (toward the left in FIG. 1) is provided at the printer section 58. A negative carrier 18, on which a negative film 16 is set, and a keyboard 15, which an operator uses to input commands, data, and the like, are provided on the top surface of the work table 14.

A light source section 36 for main exposure is provided beneath the work table 14. A light source 38 is provided in the light source section 36 for main exposure. A color correction filter (CC filter) 40 and a diffusion tube 42 are disposed in that order so that the light irradiated from the light source 38 is illuminated onto the negative film 16 set at the negative carrier 18 positioned on the work table 14. The CC filter 40 is formed by a C (cyan) filter, an M (magenta) filter, and a Y (yellow) filter which are all operated under the control of a CC filter control section 39 (see FIG. 2) so as to be able to be inserted on and withdrawn from the optical axis of light irradiated from the light source 38.

An arm 44 is provided above the negative carrier 18 (i.e., at the upper side of the negative carrier 18 in FIG. 1). An optical system 46 for main exposure and a secondary printing section 22, which carries out exposure of secondary prints such as index prints or the like, are provided within the arm 44.

A half mirror 43, an exposure lens 48 for changing the exposure magnification, a black shutter 50, and a mirror 51 are provided at the optical system 46 for main exposure in that order from the light output side of the negative film, so as to focus a negative image onto a photographic printing paper 54 set at an exposure chamber 52.

A loading section 60 is disposed at a corner section formed by the upper surface of the casing 12 and the upper right side surface of the arm 44. A paper magazine 64, which accommodates the photographic printing paper 54 in a state in which the photographic printing paper 54 is wound in layers on a reel 62, is loaded in the loading section 60. A roller pair 66 is provided in a vicinity of the loading section 60. The photographic printing paper 54 is nipped by the roller pair 66 and conveyed to the exposure chamber 52 in a horizontal state.

Rollers 67, 68 are disposed in the exposure chamber 52. The photographic printing paper 54, on which images of the negative film 16 are printed at the exposure chamber 52, is conveyed by the rollers 66, 67, 68 to the processor section 72 which will be described hereinafter.

A color developing processing tank 74 which stores color developing processing solution, a bleaching/fixing processing tank 76 which stores bleaching/fixing solution, and a plurality of rinsing processing tanks 78 which store rinsing processing solution, are provided at the processor section 72. Developing, fixing, and rinsing processings are carried out by the photographic printing paper 54 passing through the respective tanks in order. The photographic printing paper 54 which has been subjected to rinsing processing is conveyed, and is subjected to drying processing in a drying section 80 which is adjacent to the rinsing processing tanks 78.

The photographic printing paper 54 is nipped by an unillustrated pair of rollers and, after drying processing has been completed, is discharged from the drying section 80 at a fixed speed. A cutter section 84 is provided at the downstream side of the drying section 80. The photographic printing paper 54 is cut per image frame by an unillustrated cutter, and the cut photographic prints are discharged to a sorter section 92. At the sorter section 92, sorting and a predetermined inspection operation are carried out. After unsatisfactory prints such as blurred prints or the like are removed by this inspection operation, the normal photographic prints are returned to the customer together with the negative film.

Figure 2:
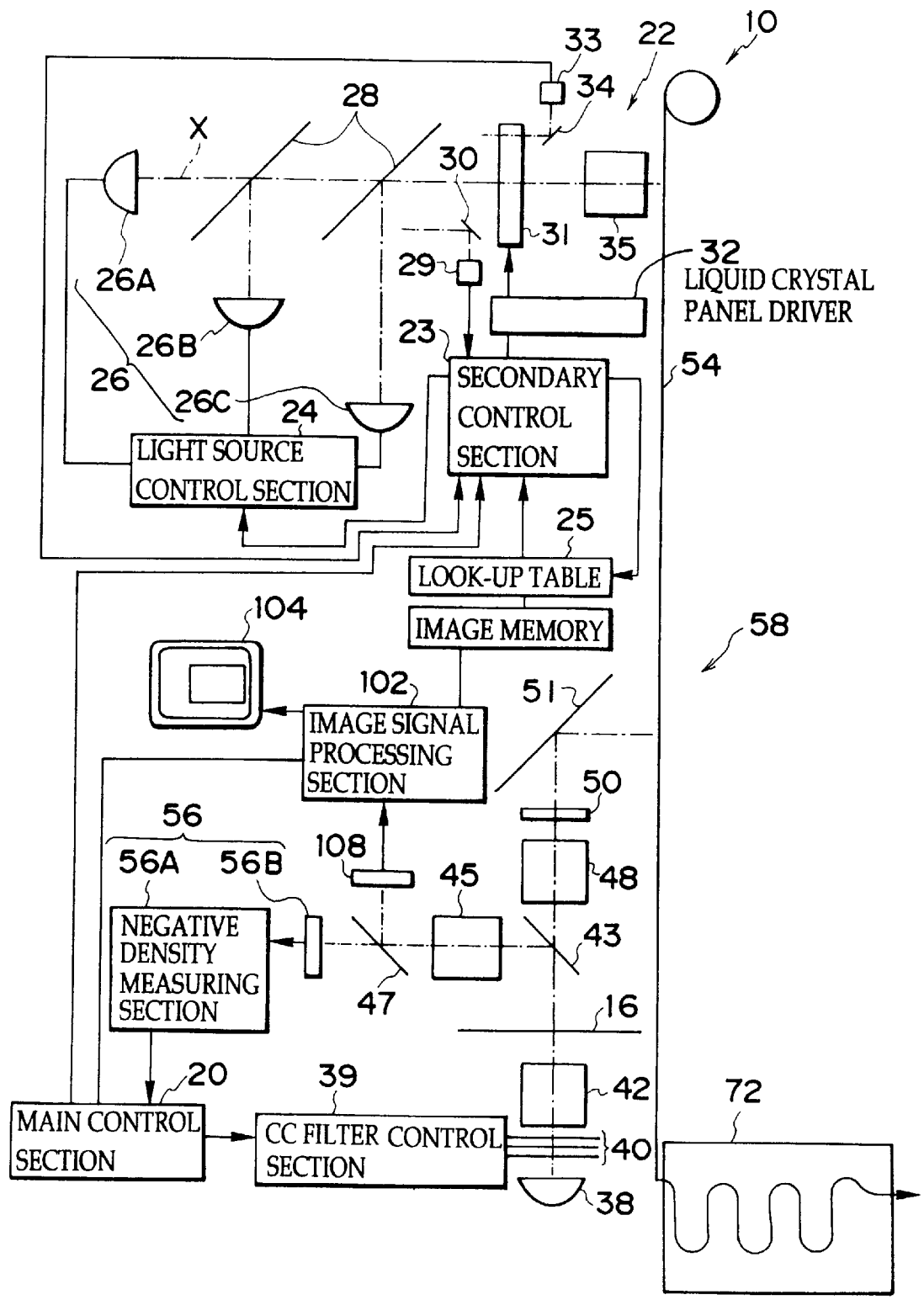
FIG. 2 is a block diagram illustrating the structure of a printer section at the printer processor.

As illustrated in FIG. 2, a lens 45 for photometry which changes the magnification of the image for photometry and a half-mirror 47 are disposed in that order at the downstream side of the optical path reflected by the half-mirror 43. In the present embodiment, the lens 45 for photometry is fixed at a predetermined magnification.

A scanner 108 formed by an image sensor or the like is disposed at the side of the half-mirror 47 in the direction in which light is reflected by the half-mirror 47. An image signal processing section 102, which carries out predetermined image processing for the image data of each frame of the negative film 16 read by the scanner 108, is connected to the scanner 108.

A monitor 104 is connected to the image signal processing section 102. For the image of each frame of the negative film 16, a simulated image of a print which would be made on the basis of set conditions is displayed on the monitor 104. Further, an image memory 106 for storing image data is connected to the image signal processing section 102. The image signal processing section 102 stores in the image memory 106 the image data of the respective frames of the negative film 16 read by the scanner 108.

A negative density measuring section 56, which measures the image density of each frame of the negative film 16, is provided at the downstream side of the optical path which is transmitted through the half-mirror 47. The negative density measuring section 56 is formed by a scanner 56B, which is formed by an image sensor or the like, and a negative density measuring device 56A, which measures the image density of each frame of the negative film 16 read by the scanner 56B. The negative density measuring device 56A is connected to a main control section 20.

The main control section 20 is disposed beneath the exposure chamber 52 (see FIG. 1). The main control section 20 is formed by an unillustrated CPU, RAM, ROM, input/output controller and the like. The CC filter control section 39, the negative density measuring device 56A, the image signal processing section 102, and a secondary control section 23 which will be described later are connected to the main control section 20. The main control section 20 monitors and controls the operations of these structural devices.

The above explanation describes the exposure system relating to the main exposure section. In the present embodiment, in addition to the main exposure section, an exposure system is provided for the secondary printing section 22 which prepares index prints on the basis of the image data stored in the image memory 106.

A light-emitting diode 26A which emits red light hereinafter, "R-LED 26A"), a light-emitting diode 26B which emits green light (hereinafter, "G-LED 26B"), and a light-emitting diode 26C which emits blue light (hereinafter, "B-LED 26C") are provided at the secondary printing section 22 as a light source 26 for index image exposure whose operations are controlled by a light source control section 24. The respective diodes are disposed such that the light irradiated from the G-LED 26B and the light irradiated from the B-LED 26C coincide, due to a dichroic mirror 28, with the exposure optical axis X of the light irradiated from the R-LED 26A.

The light source control section 24 is connected to the secondary control section 23 which will be described later. In accordance with signals from the secondary control section 23, the light amount corresponding to the respective color components of the light source 26 are adjusted so that the exposure amount of the images printed on the photographic printing paper 54 can be corrected.

A liquid crystal panel 31 is disposed at the downstream side of the exposure optical axis X of the light source 26. A mirror 30 is disposed in a vicinity of the liquid crystal panel 31 at a position which does not affect the image. A light source light amount sensor 29 is disposed at the side of the mirror 30 in the direction in which the mirror 30 reflects light. The light source light amount sensor 29 measures the light amount of the light irradiated from the light source.

A plurality of liquid crystal elements are arrayed systematically at the liquid crystal panel 31. The liquid crystal panel 31 can transmit light at, for example, 256 stages (corresponding to gradations) in accordance with signals from a liquid crystal panel driver 32 connected to the liquid crystal panel 31.

The liquid crystal panel 31 is connected to the secondary control section 23 via the liquid crystal panel driver 32. The secondary control section 23 is formed by a microcomputer which is formed from a CPU, RAM, ROM, an input/output controller and the like. The secondary control section 23 is connected to a look-up table 25. The look-up table 25 is connected to the image memory 106.

At the look-up table 25, the image data of the respective frames of the negative film 16, which image data are stored in the image memory 106, are converted into driving data for driving the liquid crystal panel 31 in accordance with a conversion table set in advance.

The second control section 23 reads, via the look-up table 25, the driving data which corresponds to the image data of the image frames of the negative film 16 and which is stored in the image memory 106. The second control section 23 forms driving data which corresponds to index image data of one roll in which image frames are arranged in a predetermined arrangement. The formed liquid crystal panel driving data of images corresponding to a predetermined number of frames among the index image data of one roll, e.g., the liquid crystal panel driving data corresponding to image data of five frames (one row), are outputted to the liquid crystal panel driver 32 by the secondary control section 23 as signals corresponding to the transmitting states of the respective liquid crystal elements. In this way, the liquid crystal panel driver 32 controls the transmitting states of the liquid crystal elements (pixels) in accordance with the signals, and a corresponding image is displayed on the liquid crystal panel 31.

In addition to forming the index image data, the secondary control section 23 also functions to set in advance the conversion table in the look-up table 25 in accordance with the characteristics of the liquid crystal panel 31 and the light source 26. This will be described in more detail later.

A mirror 34 is disposed at the light output side of the liquid crystal panel 31 at a position which does not affect the image. A transmitted light amount sensor 33 is disposed at the side of the mirror 34 in the direction in which the mirror 34 reflects light, measures the light amount of the transmitted light of the liquid crystal panel 31, and is connected to the secondary control section 23.

An exposure lens 35, which can change the magnification, is disposed at the light output side of the liquid crystal panel 31. The transmitted image of the liquid crystal panel 31 is focused onto the photographic printing paper 54 at a predetermined magnification by the exposure lens 35.

The light source control section 24, the light source light amount sensor 29 and the transmitted light amount sensor 33 are connected to the secondary control section 23. On the basis of the light amount values of R, G, B measured by the light source light amount sensor 29, the secondary control section 23 computes the appropriate light amount correction amount, and has the light amount of the respective components of the light source 26 corrected by the light source control section 24. Similarly, on the basis of the transmitted light amount values measured by the transmitted light amount sensor 33, the secondary control section 23 controls the liquid crystal panel driver 32 so that the transmitted light amount become appropriate transmitted light amount, and adjusts the densities of the images displayed on the liquid crystal panel 31.

In addition to the regular mode for forming index prints, the secondary control section 23 also includes a look-up table correction mode for correcting in advance the conversion table at the look-up table 25 in accordance with the characteristics of the light source 26 and the liquid crystal panel 31.

Figure 3:
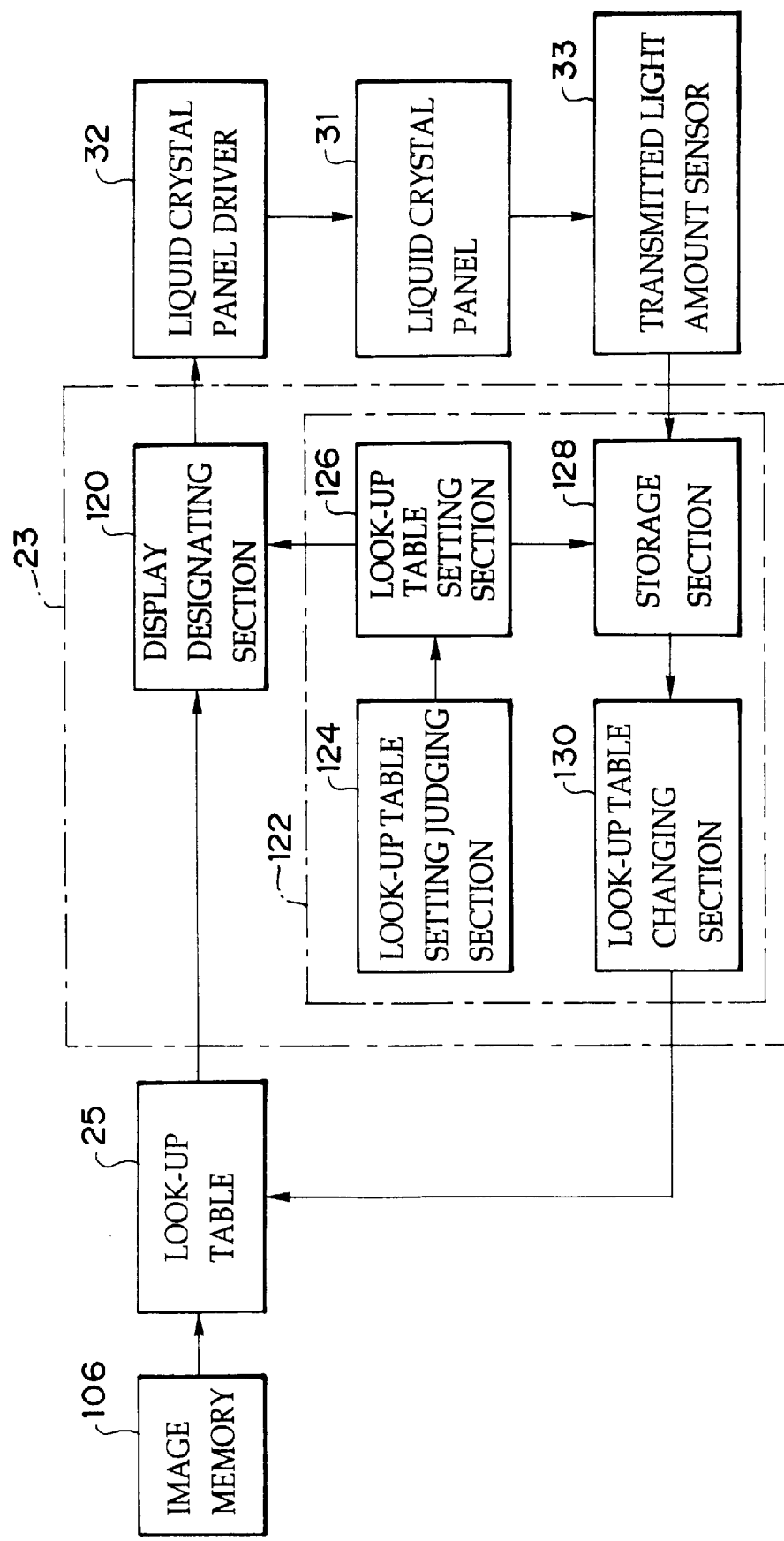
FIG. 3 is a system structural view for explaining a secondary control section at the time that a look-up table is corrected.

Hereinafter, with reference to FIG. 3, description will be given of the secondary control section 23 at the time of executing the look-up table correction mode.

A look-up table setting section 122 is provided at the secondary control section 23. A look-up table setting judging section 124 is provided at the look-up table setting section 122.

At the look-up table setting judging section 124, a judgment is made as to whether setting of the look-up table should be carried out. At this time, the look-up table setting judging section 124 judges that the look-up table is to be corrected and outputs a signal designating changing of the look-up table only in cases in which a command designating correction of the look-up table is inputted from an operator by the keyboard 15 via the main control section 20.

A driving data setting section 126 is connected to the look-up table setting judging section 124. When a signal designating changing of the look-up table is inputted from the look-up table setting judging section 124, the driving data setting section 126 sets the driving data of the liquid crystal panel 31 in steps from a shut off state to a completely on state, and outputs the driving data.

A display designating section 120 and a storage section 128 are connected to the driving data setting section 126.

The driving data is stored in the storage section 128 simultaneously with the outputting of the driving data to the display designating section 120.

The liquid crystal panel 31 is connected to the display designating section 120 via the liquid crystal panel driver 32. Via the liquid crystal panel driver 32, the display designating section 120 drives the liquid crystal panel 31 by using the driving data from the driving data setting section 126.

In a state in which the light source 26 is lit at a predetermined level, the transmitted light amount sensor 33, which is provided at the light output side of the liquid crystal panel 31, measures the amount of light transmitted through the liquid crystal panel 31.

The storage section 128 is connected to the transmitted light amount sensor 33. The measured transmitted light amount is stored in the storage section 128 in correspondence with the driving data of the liquid crystal panel 31.

A look-up table changing section 130 is connected to the storage section 128. The look-up table 25 is connected to the lookup table changing section 130. The look-up table changing section 130 corrects the contents of the look-up table 25 with reference to the driving data and the transmitted light amount of the liquid crystal panel which are stored in the storage section 128.

Figure 4:
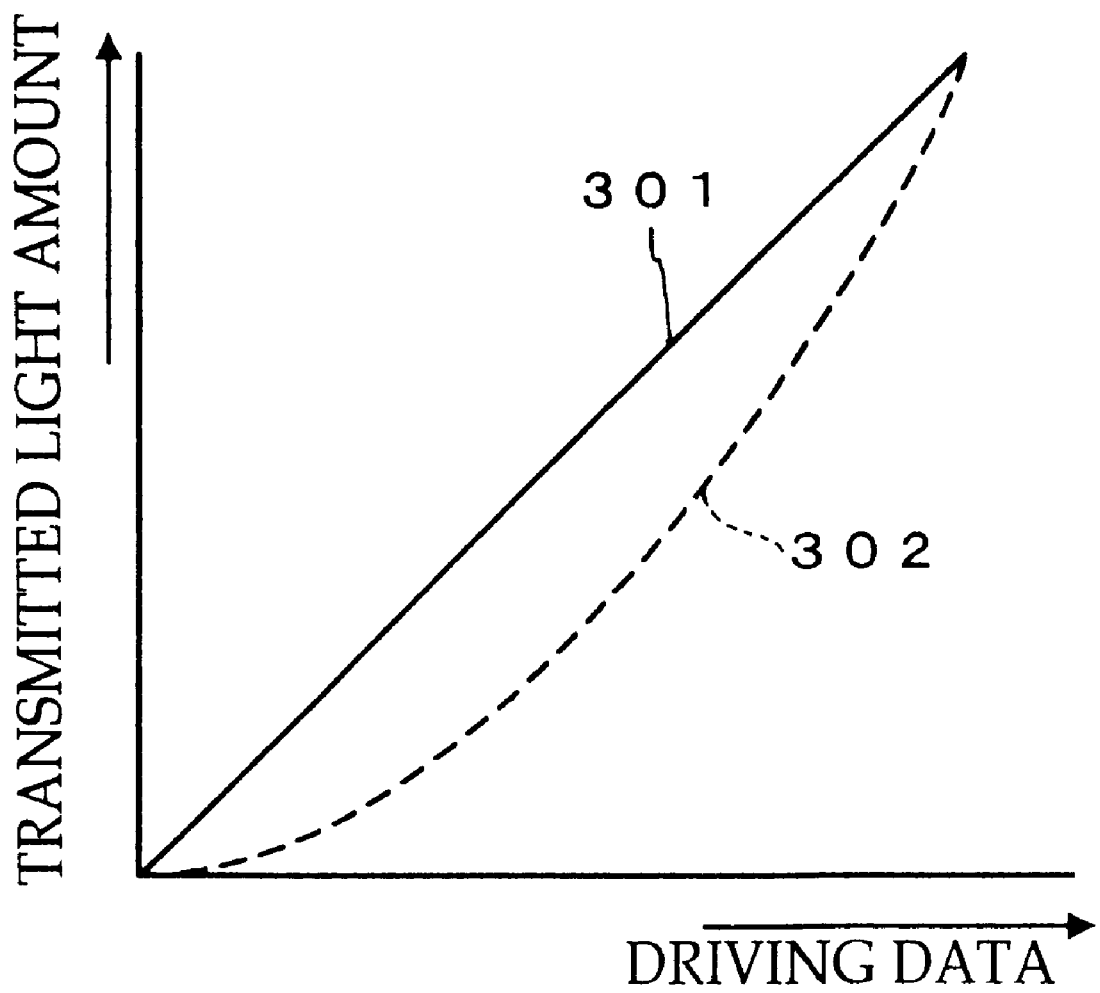
FIG. 4 is a graph illustrating the relationship between transmitted light amount and driving data of a liquid crystal panel.

It is ideal for the relationship between the driving data and the transmitted light amount to be linear as illustrated by an ideal characteristic 301 in FIG. 4. However, in actuality, due to variations in the characteristics of the liquid crystal panel 31 and the light source 26 and the like, the relationship is as illustrated by, for example, actual characteristic 302, and these values are stored in the storage section 128. On the basis of the values stored in the storage section 128, the look-up table changing section 130 changes the contents of a changing table of the look-up table 25 such that the characteristic of the driving data and the transmitted light amount becomes linear such as the ideal characteristic 301.

Next, operation of the present embodiment will be described.

At the printer section 58 of the printer processor 10, a negative film 16, on which images to be printed are recorded, is set at the negative carrier 18, and light from the light source 38 is transmitted through the negative film 16. The density of the image of the negative film 16 which has been imaged by the light passing through the negative film 16 is measured by the negative density measuring section 56. On the basis of the measured density of the image of the negative film 16, optimal exposure conditions (e.g., the amount of insertion of each filter of the CC filter 40 onto the optical path, or the like) are set by the main control section 20. On the basis of the set exposure conditions, the image of the negative film 16 is printed onto a predetermined printing region of the photographic printing paper 54.

During exposure processing of the image at the secondary printing section 22, the transmitted image of the negative film 16 is read by the scanner 108. The read image data is stored in the image memory 106 via the image signal processing section 102. The image data is read from the image memory 106 by the secondary control section 23 via the look-up table 25. On the basis of the driving data obtained via the look-up table 25, the image displayed on the liquid crystal panel 31 is exposed onto the photographic printing paper 54.

The photographic printing paper 54, on which images have been printed by the above-described exposure processing, is conveyed to the processor section 72 and is subjected to developing, fixing and rinsing processings. The photographic printing paper 54 which has been subjected to rinsing processing is conveyed to the drying section 80, and is subjected to drying processing by high temperature air. The photographic printing paper 54 which has been subjected to drying processing is conveyed to the cutter section 84 and is cut per frame so that photographic prints are formed. The photographic prints are discharged to the sorter section 92 and are sorted thereat.

In a case in which a look-up table changing designation has been inputted from an operator by the keyboard via the main control section 20, the secondary control section 23 changes the shaded state of the liquid crystal panel 31 in steps from a shut off state to a completely on state via the liquid crystal panel driver 32. The transmitted light amount of the liquid crystal panel 31 at these times are measured by using the transmitted light amount sensor 33. The contents of the look-up table 25 are corrected on the basis of the relationship between these transmitted light amount and the driving data of the liquid crystal panel 31 at those times.

Figure 5:
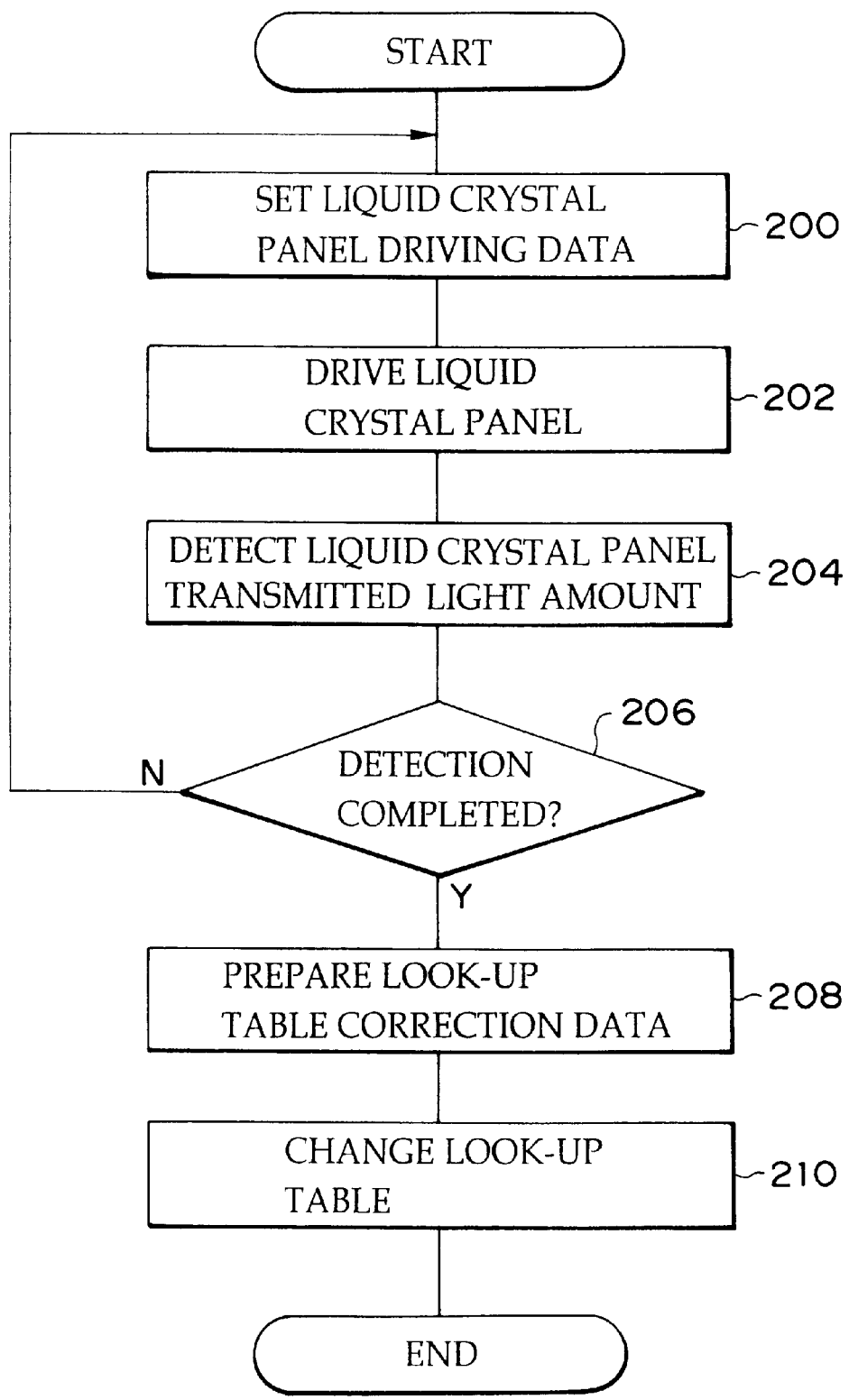
FIG. 5 is a flowchart illustrating look-up table correction processing.

Next, processing for correcting the look-up table 25, which processing is carried out by the secondary control section 23, will be described in detail with reference to FIG. 5.

Conversion settings based on characteristics of standard liquid crystal panels and exposure light sources are formed in advance in the look-up table 25.

When correction of the look-up table 25 is designated by an operator, in step 200, data for driving the liquid crystal panel 31 is set. The data for driving the liquid crystal panel 31 at this time is set by using a preset original value, an upper limit value and an increment value. Immediately after an operator designates correction of the look-up table 25, the initial value is set as it is, and from the next time on, when step 200 is implemented, the initial value is set to a value which is equal to the value set the previous time plus the increment value. In the present embodiment, the initial value is a value at which the shaded state of the liquid crystal panel 31 is shut off, and the upper limit value is a value at which the shaded state of the liquid crystal panel 31 is completely on.

When the driving data of the liquid crystal panel 31 is set in step 200, in step 202, the liquid crystal panel 31 is driven on the basis of the driving data.

When the liquid crystal panel 31 is driven, in step 204, with the light source 26 lit to a predetermined level, the transmitted light amount of the liquid crystal panel 31 is detected by using the transmitted light amount sensor 33, and the transmitted light amount is stored within the secondary control section 23 in correspondence with the driving data at that time.

When the transmitted light amount and the driving data are stored in the secondary control section 23, in step 206, a judgment is made as to whether detection of all of the transmitted light amount has been completed. The judgment at this time is carried out by comparing the driving data at this step and the upper limit value set in advance. If the driving data is less than the upper limit value set in advance, it is determined that detection has not been completed, and the process returns to step 200. If the driving data is greater than or equal to the upper limit value, it is determined that detection has been completed, and the routine proceeds to step 208.

Accordingly, due to the processes of steps 200 through 206, the transmitted amount of light at the times the shaded state of the liquid crystal panel 31 is changed by the predetermined increment value from the shut off state to the completely on state, and the driving data at those times are stored.

When it is determined in step 206 that detection of all of the transmitted light amount has been completed, in step 208, look-up table conversion data is prepared. The look-up table conversion data at this time is computed as the difference from the preset conversion data so that the relationship between the transmitted light amount obtained by the transmitted light amount sensor 33 and the driving data at those times becomes substantially the same as the ideal characteristic 301 in FIG. 4.

When the look-up table conversion data is prepared, in step 210, the contents of the look-up table 25 are corrected by using the look-up table conversion data obtained in step 208. The look-up table conversion data is obtained as the difference from the preset conversion data in the look-up table 25. Therefore, here, only an addition process or a subtraction process is carried out with respect to the prior data.

Due to the above processings, the actual transmitted light amount of the liquid crystal panel at the driving data of each step are detected and are reflected in the look-up table 25. Therefore, conversion processing from image data to liquid crystal panel driving data in accordance with individual variations in liquid crystal panels and exposure light sources is made possible.

In the present embodiment, a case in which a liquid crystal panel is used as the output device is described. However, the present invention is not limited to the same, and for example, may be applied to an output device such as an injection-type printer or a heat transfer printer or the like. In this case, a sensor corresponding to the output device is provided at the output side, and the present invention can be implemented by using the sensor. For example, when an injection-type printer is used, a sensor for detecting the amount of ink discharged may be provided at the ink discharging side, and the look-up table may be changed on the basis of the results of sensor output at the driving data of the respective levels. Further, when a heat transfer printer is used, a temperature sensor may be provided at the heat output side, and the look-up table may be changed on the basis of the results of sensor output of the driving data of the respective levels.

In the present invention, any of the output devices listed in following Table 1 may be used in place of the liquid crystal panel.

TABLE 1

| Type of Output Device | Abbreviation | Name of Output Device |
| --- | --- | --- |
| light-emitting type | CRT | cathode ray tube |
|  | PDP | plasma display |
|  | ELD | electroluminescent display |
|  | VFD | vacuum fluorescent display |
|  | LED | light emitting diode |
| photo-detecting type | LCD | liquid crystal display |
|  | ECD | electrochemical display |
|  | EPID | electrophoretic image display |
|  | SPD | suspended particle display |
|  | TBD | twisting ball display |
|  | PLZT | transparent ceramics display |
|  | DMD | digital micromirror device |

In the present embodiment, a case is described in which the contents of the look-up table 25 are corrected only on the basis of the relationship between the transmitted light amount of the liquid crystal panel 31 detected by the transmitted light amount sensor 33 and the driving data at those times. However, the present invention is not limited to the same, and the look-up table may be corrected from the light source light amount detected by the light source light amount sensor 29.

The digital print preparing method and digital print preparing device relating to the present invention can prepare driving data of output devices in accordance with the differences in the individual characteristics of the driving devices. Therefore, high-quality digital prints can be prepared.

What is claimed is:

1. A method for preparing digital prints in which, when a digital index print is to be prepared on the basis of digital image data, the digital image data is converted into driving data for a secondary output device by a predetermined conversion table, and the secondary output device is driven by using the driving data, the secondary output device being in addition to a main output device for preparing digital prints, the method comprising:

recognizing, in advance of preparation of the index print, an error in a response of the secondary output device to the driving data with respect to a standard output device which obtains appropriate images by converting digital image data into driving data in accordance with the predetermined conversion table, and correcting the response of the secondary output device.

2. A device for preparing digital prints which includes a main output device which prepares digital prints on the basis of digital image data and a secondary output device which prepares digital index prints on the basis of the digital image data, the device comprising:

a conversion table which converts the digital image data into driving data for the secondary output device;

a driving data setting section which prepares driving data for driving the secondary output device;

a sensor for detecting an output state of the secondary output device at a time when the secondary output device is driven, by using driving data prepared by said driving data setting section; and a conversion table changing section which corrects a conversion table on the basis of the output state of the secondary output device detected by said sensor and on the basis of the prepared driving data.

3. The device for preparing digital prints according to claim 2, wherein said secondary output device is a liquid crystal panel, and the driving data prepared by said driving data setting section is prepared by changing, in steps, a shaded state of the liquid crystal panel, and said sensor detects a transmitted light amount of the liquid crystal panel at a time when the liquid crystal panel is driven by using the driving data.

4. A device for preparing digital prints which prepares digital prints on the basis of digital image data, the device comprising:

an output device;

a conversion table which converts the digital image data into regular driving data of the output device;

a conversion table setting judging section which determines when setting of the conversion table is to be carried out;

a driving data setting section which prepares set driving data for driving the output device upon receiving an indication from the conversion table setting judging section that setting of the conversion table is to be carried out;

a display designating section which selects either the regular driving data from the conversion table or set driving data from the driving data setting section;

a sensor for detecting an output state of the output device at a time when the output device is driven by the set driving data prepared by said driving data setting section;

a storage section wherein output state data detected by said sensor is stored in correspondence with the set driving data; and a conversion table changing section which corrects a conversion table on the basis of the output state data and on the basis of the set driving data.

5. The device for preparing digital prints according to claim 4, wherein said output device is a liquid crystal panel, and the set driving data prepared by said driving data setting section is prepared by changing, in steps, a shaded state of the liquid crystal panel, and said sensor detects a transmitted light amount of the liquid crystal panel at a time when the liquid crystal panel is driven by using the driving data.

6. A method for preparing digital prints in which, when a digital print is to be prepared on the basis of digital image data, the digital image data is converted into driving data for an output device by a predetermined conversion table, and the output device is driven by using the driving data, the method comprising:

recognizing, in advance of preparation of the digital print, an error in a response of the output device to the driving data with respect to a standard output device which obtains appropriate images by converting digital image data into driving data in accordance with the predetermined conversion table, and correcting the predetermined conversion table on the basis of the error so as to get the appropriate images by the output device.

7. A method for preparing digital prints according to claim 6, wherein the error is recognized by changing the driving data within a predetermined level.

* * * * *